(12) United States Patent
Dhanabalan et al.

(10) Patent No.: US 11,997,080 B2
(45) Date of Patent: May 28, 2024

(54) UNIFORM RESOURCE LOCATOR VALIDATION

(71) Applicant: Citrix Systems, Inc., Ft. Lauderdale, FL (US)

(72) Inventors: Praveen Raja Dhanabalan, Bangalore (IN); Krishna Kumar KB, Bangalore (IN)

(73) Assignee: Citrix Systems, Inc., Ft. Lauderdale, FL (US)

( * ) Notice: Subject to any disclaimer, the term of this patent is extended or adjusted under 35 U.S.C. 154(b) by 534 days.

(21) Appl. No.: 17/138,030

(22) Filed: Dec. 30, 2020

(65) Prior Publication Data
US 2022/0210146 A1 Jun. 30, 2022

(51) Int. Cl.
| | |
|---|---|
| *H04L 29/06* | (2006.01) |
| *H04L 9/32* | (2006.01) |
| *H04L 9/40* | (2022.01) |
| *H04L 67/02* | (2022.01) |
| *H04L 67/146* | (2022.01) |

(52) U.S. Cl.
CPC ........ *H04L 63/0823* (2013.01); *H04L 9/3263* (2013.01); *H04L 9/3268* (2013.01); *H04L 63/083* (2013.01); *H04L 67/02* (2013.01); *H04L 67/146* (2013.01)

(58) Field of Classification Search
CPC . H04L 63/0823; H04L 9/3263; H04L 9/3268; H04L 63/083; H04L 67/02; H04L 67/146
See application file for complete search history.

(56) References Cited

U.S. PATENT DOCUMENTS

| | | | | |
|---|---|---|---|---|
| 8,745,718 | B1 * | 6/2014 | Dufel | H04L 63/20 726/8 |
| 9,055,059 | B1 * | 6/2015 | Bhalerao | H04L 9/006 |
| 11,323,274 | B1 * | 5/2022 | Bowen | H04L 9/0897 |
| 11,563,590 | B1 * | 1/2023 | Bowen | H04L 9/3247 |

(Continued)

OTHER PUBLICATIONS

Josh Aas et al., Let's encrypt: An Automated Certificate Authority to Encrypt the Entire Web, Nov. 6, 2019, ACM, pp. 2473-2487. (Year: 2019).*

(Continued)

*Primary Examiner* — Luu T Pham
*Assistant Examiner* — Fahimeh Mohammadi

(57) ABSTRACT

A method for validating a Uniform Resource Locator (URL) includes generating electronic media content including the URL, generating a Certificate Signing Request (CSR) including the URL, sending the CSR to a certificate signing server, receiving a signed certificate corresponding to the CSR from the certificate signing server, and encoding the signed certificate as metadata in the electronic media content and/or encoding a serial number associated with the signed certificate as metadata in the electronic media content. A user can send the URL to another user through a chat message, an email, a word processing document or other business application, or a document which has a URL through a pen drive, email, or chat message. The certificate-based mechanism is used to validate the origin (sender) of the URL so that the recipients know that the URL can be accessed without having to separately analyze the security risks.

19 Claims, 7 Drawing Sheets

(56) References Cited

U.S. PATENT DOCUMENTS

| | | | | |
|---|---|---|---|---|
| 2006/0069735 | A1* | 3/2006 | Czeisler | H04L 67/34 707/999.009 |
| 2007/0168657 | A1* | 7/2007 | Carro | G06F 21/645 713/176 |
| 2007/0168658 | A1* | 7/2007 | Yamauchi | H04L 63/0823 713/156 |
| 2009/0199274 | A1* | 8/2009 | Frazier | H04L 63/08 726/4 |
| 2011/0145569 | A1* | 6/2011 | Liu | H04L 9/0891 713/158 |
| 2015/0007263 | A1* | 1/2015 | Stewart | H04L 63/0815 726/3 |
| 2016/0330164 | A1* | 11/2016 | Bellan | H04L 63/0823 |
| 2018/0189369 | A1* | 7/2018 | Baek | G06F 40/197 |
| 2019/0068377 | A1* | 2/2019 | Matsugashita | H04L 63/102 |
| 2019/0116153 | A1* | 4/2019 | Deverakonda Venkata | H04L 9/3268 |
| 2019/0163912 | A1* | 5/2019 | Kumar | H04L 9/0825 |
| 2019/0296918 | A1* | 9/2019 | Chang | H04L 9/006 |
| 2022/0150212 | A1* | 5/2022 | Rajput | H04L 63/166 |

OTHER PUBLICATIONS

Jinjin Liang et al., When HTTPS Meets CDN: A Case of Authentication in Delegated Service, Nov. 20, 2014, IEEE, pp. 67-82. (Year: 2014).*

Gabriel Serme et al., Enabling Message Security for RESTful Services, Aug. 6, 2012, IEEE, pp. 114-121. (Year: 2012).*

Lin-Shung Huang et al., Analyzing Forged SSL Certificates in the Wild, Nov. 20, 2014, IEEE, pp. 83-97. (Year: 2014).*

* cited by examiner

UNIFORM RESOURCE LOCATOR VALIDATION

BACKGROUND

Phishing is the fraudulent practice of inducing users to take actions that compromise computer security. For example, a phishing attack occurs when a user activates a link to a Uniform Resource Locator (URL) sent through electronic mail, chat, or other forms of communication that masquerade as legitimate messages but are used for nefarious purposes, such as to obtain control over an individual's computer, personal information, or other sensitive data that can then be used for illegitimate or illegal purposes by malicious actors. To reduce the vulnerability of a system to phishing attacks, various techniques including firewalls, intrusion detection systems (IDS), intrusion prevention systems (IPS), and anti-virus systems have been employed. For example, these techniques compare the network traffic or a data signature against a known attack signature to identify a threat. Other techniques include advisory services that distinguish between genuine websites and malicious websites, signed or authenticated messages that validate the sender of the message, and email classification tools that classify spam messages that can potentially contain links to malicious websites.

SUMMARY

One example provides a method for validating a uniform resource locator (URL). The method includes generating electronic media content including the URL; generating a Certificate Signing Request (CSR) including the URL; sending the CSR to a certificate signing server; receiving a signed certificate corresponding to the CSR from the certificate signing server; and encoding the signed certificate as metadata in the electronic media content and/or an identifier associated with the signed certificate as metadata in the electronic media content.

At least some examples of the method include one or more of the following. The method further includes validating the URL by at least one of: detecting, in the metadata, the encoded signed certificate and/or the encoded serial number associated with the signed certificate; and/or matching the URL to a domain name in the encoded signed certificate. The method further includes validating the URL prior to accessing the URL. The method further includes scanning the electronic media content to identify the URL. The method further includes sending the electronic media content including the URL and the metadata to a receiver. The method further includes generating the CSR by encoding a username in a certificate common name of the CSR and encoding the URL in a Subject Alternative Name (SAN) field of the CSR. The method further includes matching the URL in the electronic media content to a valid URL in the SAN of the encoded signed certificate.

Another example provides a computer program product including one or more non-transitory machine-readable mediums having instructions encoded thereon that when executed by at least one processor cause a process to be carried out. The process includes generating electronic media content including at least one Uniform Resource Locator (URL); generating a Certificate Signing Request (CSR) including a Subject Alternative Name (SAN) field, the SAN field including the at least one URL; sending the CSR to a certificate signing server; receiving a signed certificate corresponding to the CSR from the certificate signing server; and encoding the signed certificate and/or a serial number associated with the signed certificate as metadata in the electronic media content including the at least one URL.

At least some examples of the computer program product include one or more of the following. The process further includes opening an authenticated communication channel to a certificate signing server, where the CSR is sent to the certificate signing server via the authenticated communication channel. The electronic media content includes at least two URLs, where the SAN field includes the at least two URLs, and where the encoding includes encoding the metadata including the at least two URLs. The process further includes validating the at least one URL by detecting, in the metadata, the encoded signed certificate and/or the encoded serial number associated with the signed certificate; matching the at least one URL in the electronic media content to a domain name in a SAN field of the encoded signed certificate; and validating the encoded signed certificate prior to accessing the at least one URL. The process further includes scanning the electronic media content to identify the at least one URL. The process further includes sending the electronic media content including the at least one URL and the encoded metadata to a receiver. The process further includes generating the CSR by including a username in a certificate common name of the CSR such that the username is to be included in the certificate common name of the signed certificate received from the certificate signing server; and validating the at least one URL by matching the username in the certificate common name of the signed certificate with a username of a sender that generated the electronic media content. The process further includes verifying a user password subsequent to generating the CSR and prior to sending the CSR to the certificate signing server.

Another example provides a system including a storage and at least one processor operatively coupled to the storage. The at least one processor is configured to execute instructions stored in the storage that when executed cause the at least one processor to carry out a process including generating a Certificate Signing Request (CSR) including a Subject Alternative Name (SAN) field, the SAN field including a Uniform Resource Locator (URL); sending the CSR to a certificate signing server; receiving a signed certificate corresponding to the CSR from the certificate signing server; and encoding the signed certificate and/or a serial number associated with the signed certificate as metadata in electronic media content including the URL.

At least some examples of the system include one or more of the following. The process further includes generating the electronic media content including the URL. The process further includes opening an authenticated communication channel from the sender to a certificate signing server, where the CSR is sent to the certificate signing server via the authenticated communication channel. The process further includes validating the URL by detecting, in the metadata, the encoded signed certificate and/or the encoded serial number associated with the signed certificate; matching the URL in the electronic media content to a SAN field of the encoded signed certificate in the metadata; and validating the encoded signed certificate prior to accessing the URL. The process further includes generating the CSR by including a non-URL unique username to be used as a certificate common name associated with the signed certificate in addition to the URL in the SAN field. The process further includes verifying a user password associated with the unique username subsequent to generating the CSR and prior to sending the CSR to the certificate signing server.

Other aspects, examples, and advantages of these aspects and examples, are discussed in detail below. It will be understood that the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
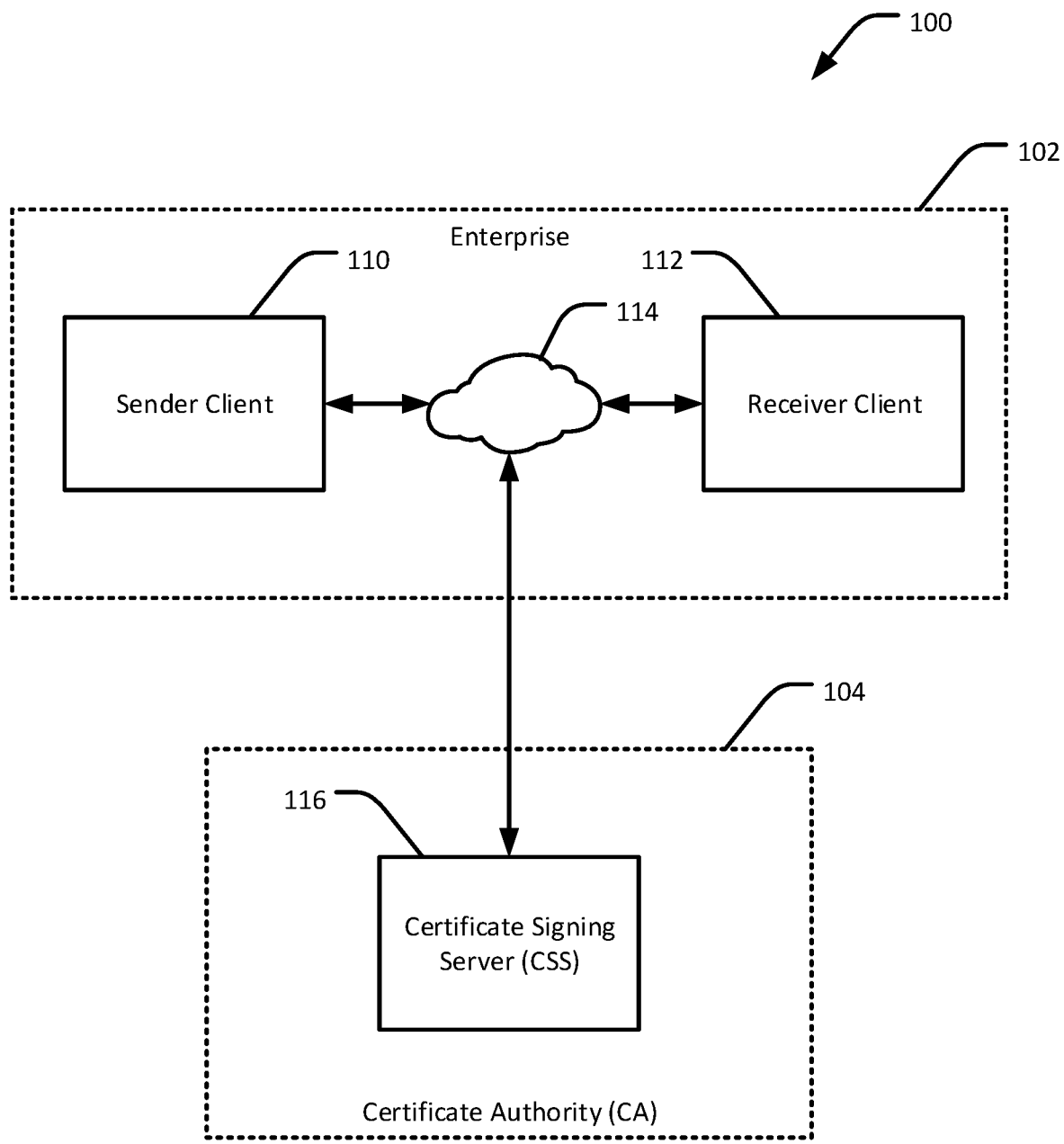
FIG. 1 is a block diagram of a URL validation system, in accordance with an embodiment of the present disclosure.

As summarized above, techniques are disclosed for validating a URL using a certificate-based mechanism. For example, a user in an enterprise can send a URL to another user through: a chat message; an email; a word processing document or other business application; a document which has a URL through a pen drive, email, or chat message; or any other form of electronic media content. The certificate-based mechanism is used to validate the source of the shared URL so that the recipient user trusts that the URL can be accessed without having to separately analyze the security risks. For example, a URL validated using the disclosed techniques can be displayed to the recipient user in a unique color (such as green), which indicates that the URL is valid, whereas unvalidated or invalid URLs are displayed in another color (such as red). Other visual indications can be used to highlight validated URLs in accordance with various examples.

Typically, phishing attacks occur when a user opens a malicious web page linked from a URL sent through email, messaging or notification services, electronic documents, or web pages. For such attacks, often these URLs are disguised as shortened URLs in which the domain of the destination is not visible to the user, slightly modified URLs that appear familiar but have misspelled names, and hyperlinks embedded in the text of a message or document. If a user accesses (clicks) a URL, the web page may execute code that can be used to obtain control of the user's computer or sensitive information without the user's knowledge. Some websites use Hypertext Transfer Protocol Secure (HTTPS) for secure communications over a computer network. HTTPS utilizes a trusted third party to sign server-side digital certificates for authentication. These certificates can be viewed by a user via the browser, and in most instances the browser will warn the user if the certificate for the currently displayed web page is invalid. However, not all websites use HTTPS, and even those that do could still be malicious. Furthermore, users often do not independently view and verify the certificates, or they ignore the invalid certificate warnings. Moreover, other applications, such as email, word processing, or messaging apps do not support HTTPS certificate validation but nevertheless provide so-called live links that allow users to access a URL in a separate browser application, which increases the risk of a user unknowingly activating a phishing attack.

To address these and other concerns, examples of the present disclosure provide techniques for validating a URL independently of the electronic content containing the URL. This technique works across applications seamlessly, such as email, chat, workspace applications, documents, and social networking applications. For example, if a URL is forwarded from email to a chat application (using, for instance, copy-paste), the URL is automatically validated without user intervention. Similarly, if a word document containing a URL is shared through any tool, a device that receives the word document can automatically validate the URL in the document. In this manner, the recipient user of the URL can be assured that the URL is valid regardless of which application the sender uses to share the URL.

Examples of the present disclosure utilize a Certificate Authority (CA) to issue a signed digital certificate that is associated with the URL in the electronic media content. A CA is an entity that is trusted by an enterprise to issue the signed certificates using a public key infrastructure (PKI). The CA validates the identity of the party requesting the certificate using the PKI, and then issues the signed certificate according to a Certificate Signing Request (CSR), which includes the URL. The signed certificate includes data to be used by a recipient client to verify that the URL was created by the sender client and has not been modified or otherwise altered since creation, thus providing confidence that accessing the URL will not compromise security or invoke a phishing attack.

A PKI infrastructure is implemented within the enterprise for requesting signed certificates from an authorized CA that can honor the CSR from a client machine within the enterprise. The infrastructure can, in some examples, utilize an authenticated communication channel between the enterprise and the CA to reduce the risk of redirection to an unauthorized CA or other server.

In some examples, the sender client that initially shares the URL obtains a corresponding certificate for the URL as follows. The sender client software, which can be a chat application, an email client, a document writer, etc., opens a secure, authenticated channel to the CSS using the user's credentials. A plugin or other application creates the CSR. The CSR includes several data fields including a common name field and a Subject Alternative Name (SAN) list. The common name is a username associated with the sender client, and the SAN contains the URL which is being shared. Depending on configuration, one certificate can be created for each URL, or one certificate can be created for multiple URLs in the same document, where the SAN includes all of the valid URLs. The sender client then forwards the CSR to a central server which acts as the CA. The CA signs the CSR and returns the certificate to the sender. The private key corresponding to the CSR can then be deleted, as it is no longer needed since the URL is not signed in the document. Rather, the recipient uses an enterprise certificate to validate that the certificate containing the URL was signed by an authorized CA. The sender can then share electronic media content containing the URL and the corresponding certificate, which is encoded as metadata in the content along with the URL. The electronic media content can include any form of digital content, such as documents, messages, emails, or other forms of content that include text or graphics representing a URL or an encoded link to a URL (such as http or https addresses that are active, that is, capable of automatically accessing the resources at the address when accessed by the user).

The recipients of the URL can open the electronic media content using appropriate application software and use the signed certificate to validate the URL by confirming that the signed certificate is issued by the enterprise CA and contains the URL. In some cases, enterprise certificates are pushed to the client when the client first joins the domain or the enterprise network. In some other examples, another (non-enterprise) trusted CA is used, where the trust relationship is separately established. The enterprise certificate is compared to the signed certificate with the URL to confirm both certificates are issued by the same CA. If the certificate validation succeeds, then the SAN of the signed certificate containing the valid URL is checked to see if it contains the same URL as in the content. If so, the URL is displayed as valid in the recipient's software (for example, as green indicating that the URL is valid), otherwise the URLs are displayed as invalid (for example, in red with a strikethrough indicating that the URLs are not valid). A URL is invalid if there is no certificate associated with the URL (that is, there is no certificate metadata in the electronic media content), the certificate associated with the URL is not signed by the enterprise CA, or the URL in the certificate's SAN field does not match the URL in the content.

Example URL Validation System

FIG. 1 is a block diagram of a URL validation system 100, in accordance with an embodiment of the present disclosure. At least a portion of the system 100 is designated as an enterprise 102, which is a collection of computing resources allocated for use by a business or organization, such as a school, group, or government. The enterprise 102 includes at least one sender client 110, at least one receiver client 112, and at least one communication network 114 for connecting the sender client 110 to the receiver client 112. The system 100 further includes a certificate authority (CA) 104 having at least one Certificate Signing Server (CSS) 116 connected to the sender client 110 and the receiver client 112 via the network 114. The CA 104 can be within or outside of the enterprise 102. The CA 104 is an entity that issues digital certificates. As noted above, the certificate certifies to the receiver client 112 that the URL was created by the sender client 110 and has not been modified or otherwise altered since creation. This allows the enterprise 102 to trust and rely upon signatures that correspond to a certified public key. Trusted certificates can also be used to create secure connections from the enterprise 102 to the URL via the Internet to circumvent a malicious website or other resource. The sender client 110 and the receiver client 112 each use the CSS 116 to authenticate the CA signature for the URL before launching a secure connection to the URL.

The resources within the enterprise 102 can be managed and maintained according to policies established by the business or organization, which distinguishes the enterprise 102 from computing resources that are not under the purview or control of any particular business or organization. Policies and systems can be established for mitigating or otherwise reducing the damage caused by phishing attacks, viruses, malware, or other risks to the computing resources within the enterprise 102. Such policies and systems can include, for example, firewalls configured to prevent attacks from reaching the enterprise 102, advisory services that identify malware websites, emails signed by a trusted authority, and classifiers that segregate spam emails from legitimate emails. However, the enterprise 102 may still be vulnerable to attacks that circumvent these techniques.

Example URL Validation Data Flows

Figure 2:
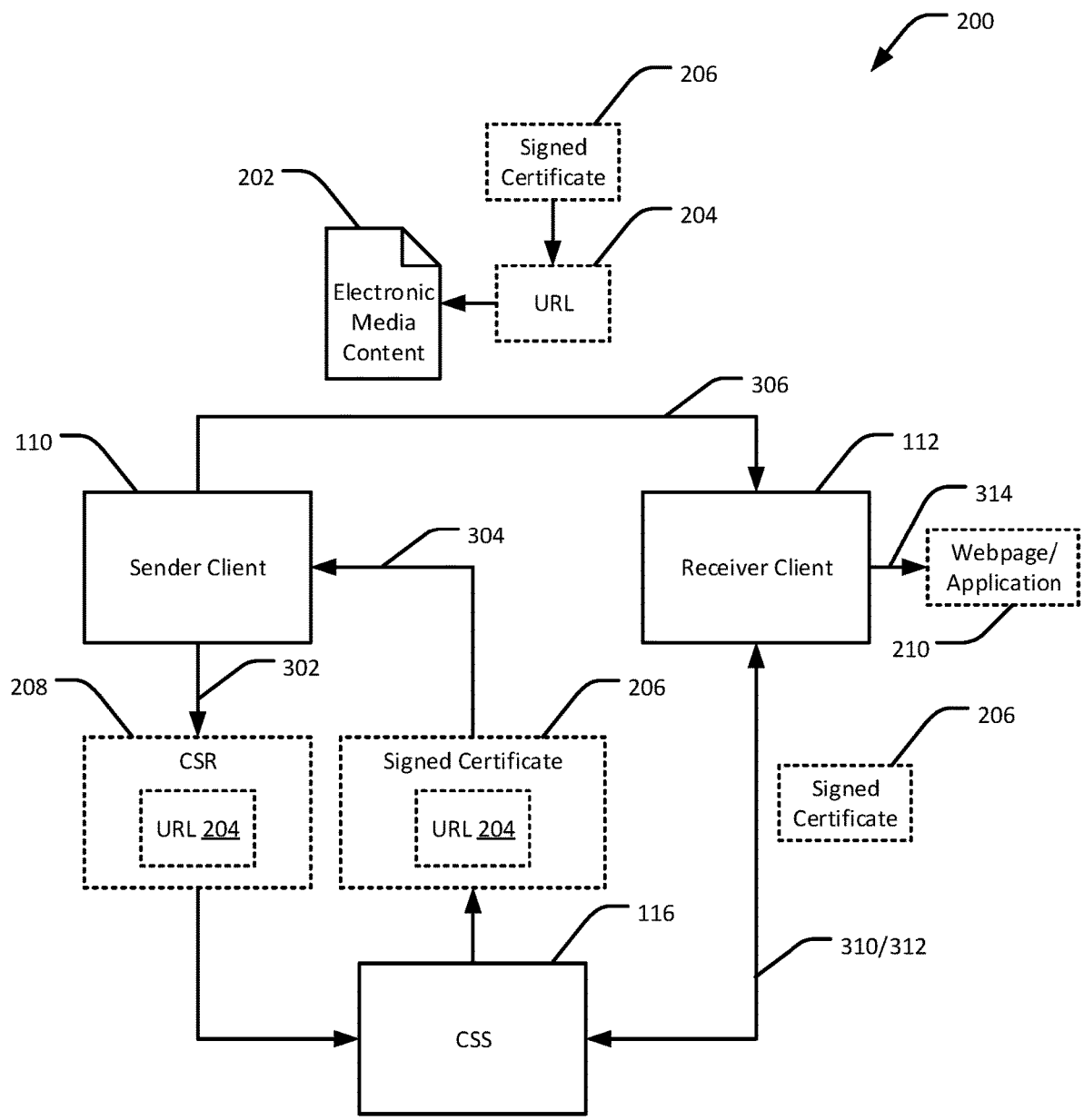
FIGS. 2 and 3 are data flow diagrams of an example URL validation technique, in accordance with an embodiment of the present disclosure.
Figure 3:
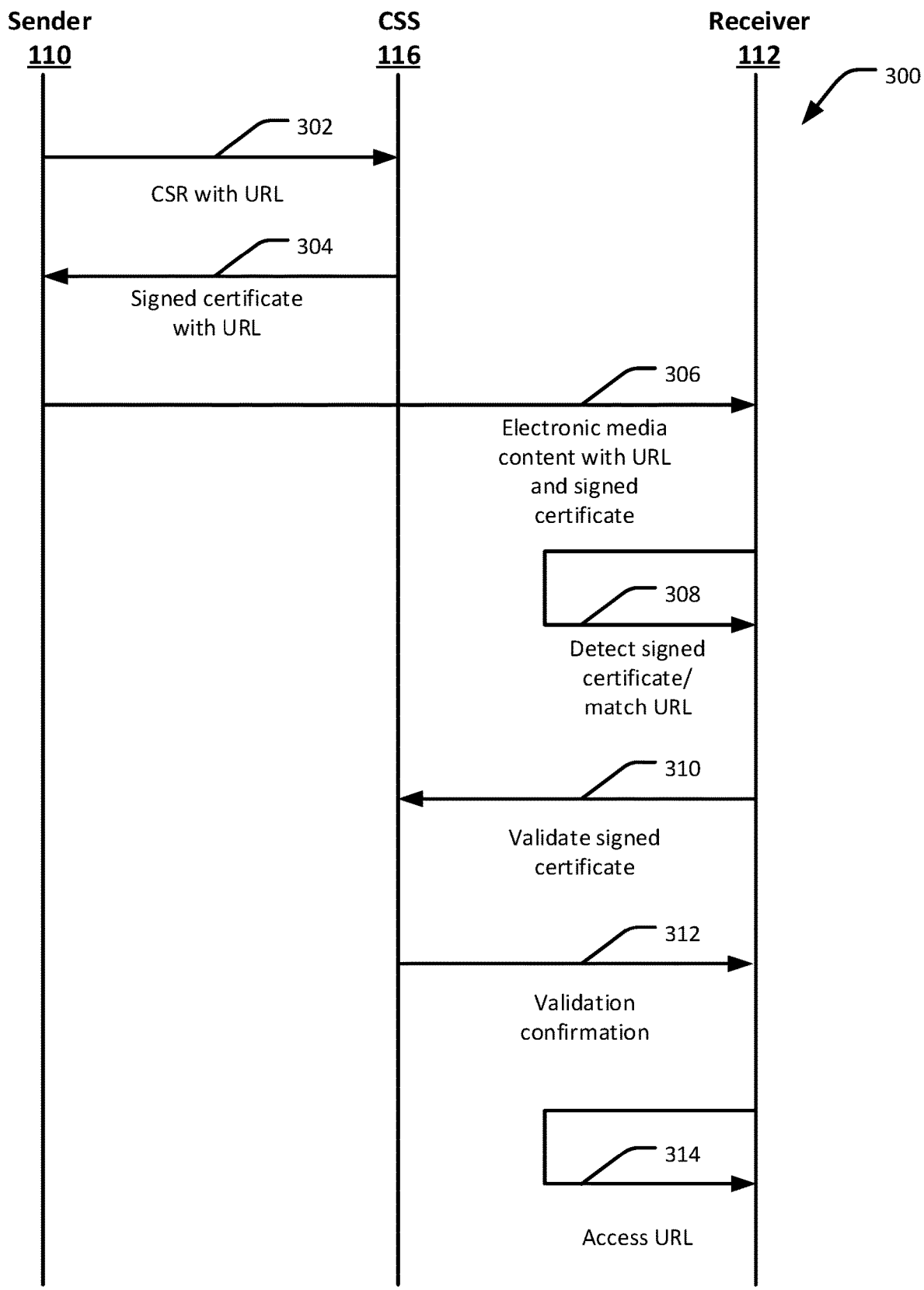

FIGS. 2 and 3 are data flow diagrams 200 and 300 of an example URL validation technique, in accordance with an embodiment of the present disclosure. FIGS. 2 and 3 will now be discussed in unison, where FIG. 2 represents the data flow at a process level and FIG. 3 represents the data flow at a device/component level. The sender client 110 generates electronic media content 202, which includes a URL 204 and metadata representing a signed certificate 206 associated with the URL 204. The electronic media content 202 includes, for example, a word processing document, a text message, an email, or any other content that includes the URL 204. The URL can be displayed in a protocol/hostname/filename format (http://www.example.com), or as text or graphics that include a hyperlink to the URL. The signed certificate 206 is generated as follows. The sender client 110 generates a certificate signing request (CSR) 208, which includes the URL 204 along with other particulars needed by the CSS 116 for completing the request, such as a public key, identifying information for the sender client 110 (such as a username of the sender encoded in the common name field), and a digital signature. The CSR 208 can be encoded according to an encoding standard such as PKCS #10, as will be understood. The CSR 208 is then sent 302 to the CSS 116, which is the trusted certificate authority for the sender client 110 and the receiver client 112. The CSS 116 generates the signed certificate 206 for the URL 204 and sends 304 the signed certificate 206 back to the sender client 110. The signed certificate 206 includes the URL 204 (or a list of URLs) along with other identifying information, such as a serial number or other unique identifier, an issuer (such as the CA 104), valid dates/times, the public key, the username of the sender, and a signature. The URL 204 (which is a valid URL) is encoded by the CSS 116 in the SAN field of the signed certificate 206, although in some examples it is alternatively or additionally encoded in the common name field. The electronic media content 202, including the URL 204 and the signed certificate 206 metadata, are then sent 306 to the receiver client 112. The receiver client 112 detects 308 the signed certificate 206 and validates 310 the signed certificate 206 with the CSS 116 by confirming that the certificate contains the URL and is issued by the enterprise CA or other trusted CA. If valid, the CSS 116 sends 312 a validation confirmation back to the receiver client 112. A user of the receiver client 112 can access 314 a web page or application 210 associated with the validated URL 204.

Example URL Validation Methodologies

Figure 4:
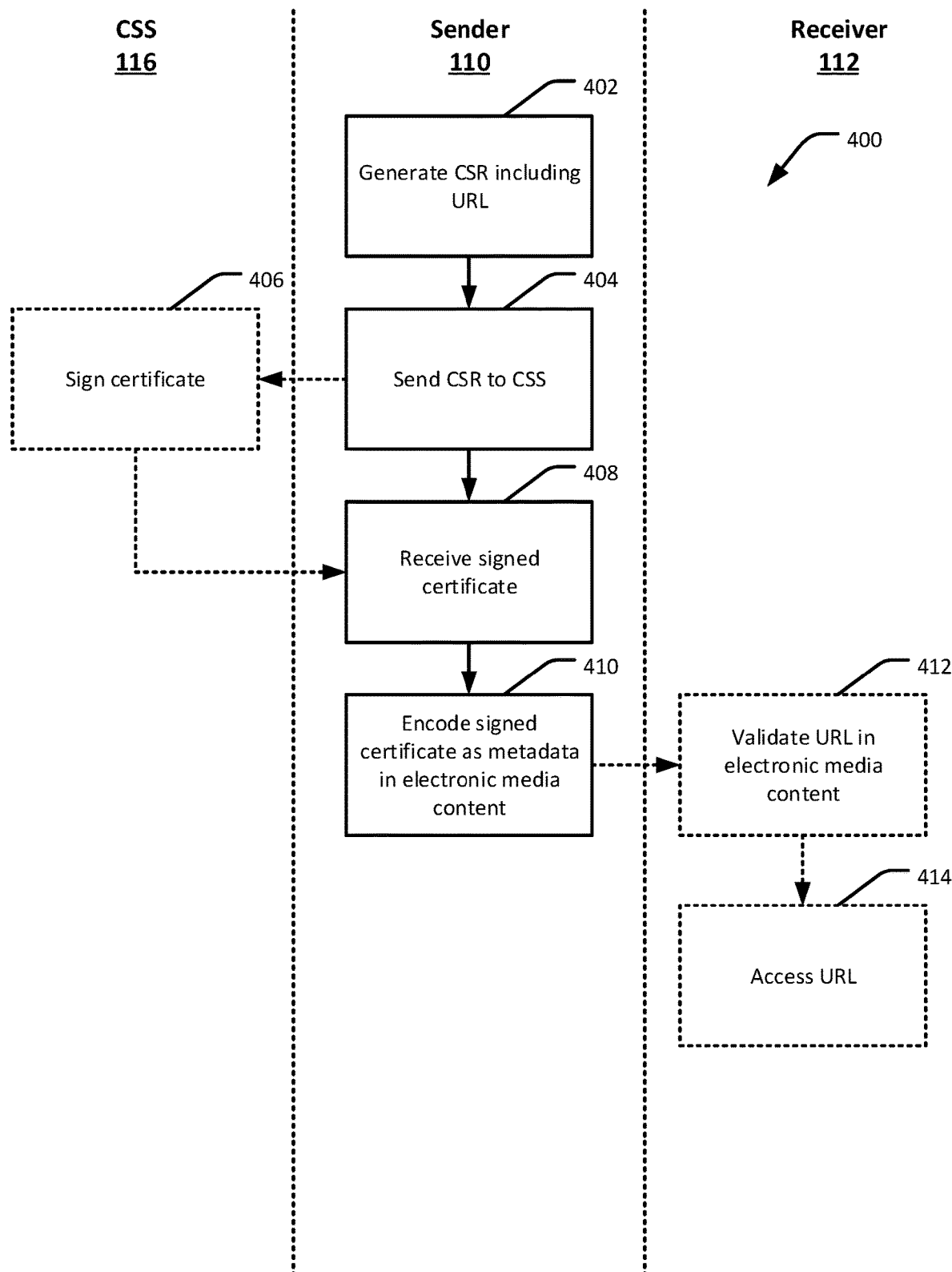
FIG. 4 is a flow diagram of an example method for validating a URL, in accordance with an embodiment of the present disclosure.

FIG. 4 is a flow diagram of an example method 400 for validating a URL, in accordance with an embodiment of the present disclosure. The method 400 can be implemented, for example, in the sender client 110, the CSS 116, and/or the receiver client 112 of FIG. 1. The method 400 provides support for the validation of certificates. If the client does not support the validation, the URLs may be displayed without any validation. To this end, in some examples, the method 400, or portions thereof, can be implemented within a plugin module executing on the sender client 110 and/or the receiver client 112. Such a plugin module executes in the background and in conjunction with the application used to generate the electronic media content. In another example, the method 400, or portions thereof, can be provided natively by the application used to generate the electronic media content.

The method 400 includes generating 402 a Certificate Signing Request (CSR) including the URL. The CSR is a block of encoded text that is given to a Certificate Signing Server (CSS) when requesting a signed certificate or SSL certificate. The CSR can be generated by the sender client 110, which also provides the URL. The CSR contains information that will be included in the certificate such as the organization name, common name (URL domain name), locality, and country. In some examples, the URL can be encoded in the Subject Alternative Name (SAN) field of the certificate, and the common name is encoded with a unique username associated with the sender client 110 or the user requesting the certificate. To provide additional security, a user password associated with the unique username can be validated subsequent to generating the CSR and prior to sending the CSR to the CSS 116. Such password validation helps ensure that the user is in control of the electronic media content with the URL when the CSR is sent to the CSS 116, as opposed to an intruder or malware having taken control of, and potentially modifying, the URL before the signed certificate is obtained. The method 400 further includes sending 404 the CSR to the CSS 116. The CSS 116 uses the CSR to sign 406 the certificate. The signed certificate is data used to authenticate that the URL was sent by the sender client 110. The CSS 116 sends the signed certificate to the sender 110. The method 400 further includes receiving 408 the signed certificate corresponding to the CSR from the CSS 116.

The method 400 further includes encoding 410 the signed certificate as metadata in the electronic media content and/or encoding a serial number or other unique identifier associated with the signed certificate as metadata in the electronic media content. By encoding the signed certificate (or its serial number/unique identifier) as metadata in the electronic media content, the URL and the metadata can be copied and pasted together into another document or other content so that the signed certificate is carried along with the URL or the recipient can request the certificate from the CA using the serial number/unique identifier. If the URL is subsequently modified, the electronic media content scans the content for a new URL, and if one exists, a new certificate is generated with authorization from the sender client 110.

In some examples, the method 400 further includes validating 412 the URL in the electronic media content prior to accessing 414 the URL (such as by clicking on the link to open the corresponding web page or application). The validating 412 can be performed by the receiver client 112 upon or after receiving the electronic media content with the URL from the sender client 110. The URL can be validated by determining whether the signed certificate is signed by the CA using an enterprise CA certificate. The enterprise CA certificate is provided to the sender and receiver clients when the client joins the domain or the enterprise network. If the certificate validation succeeds, then the certificate is checked to determine whether it contains the URL in the electronic media content. If yes, the URL is displayed as valid on the receiver client 112 (for example, using green text or highlighting over the URL or corresponding text in the electronic media content), otherwise the URL is displayed as invalid (for example, using a strikethrough, or red text or highlighting over the URL or corresponding text in the electronic media content). A URL is invalid, for example, if no certificate is associated with the URL, the certificate associated with the URL is not signed by the CA, or the URL in the certificate does not match the URL in the electronic media content. In some examples, an invalid URL can still be accessed by the user, but such a URL does not have the security benefits afforded by URLs validated according to the techniques disclosed herein. In some other examples, an invalid URL can be inactivated (plain or truncated text) so that the user cannot simply click on a corresponding hyperlink to access the URL.

Figure 5:
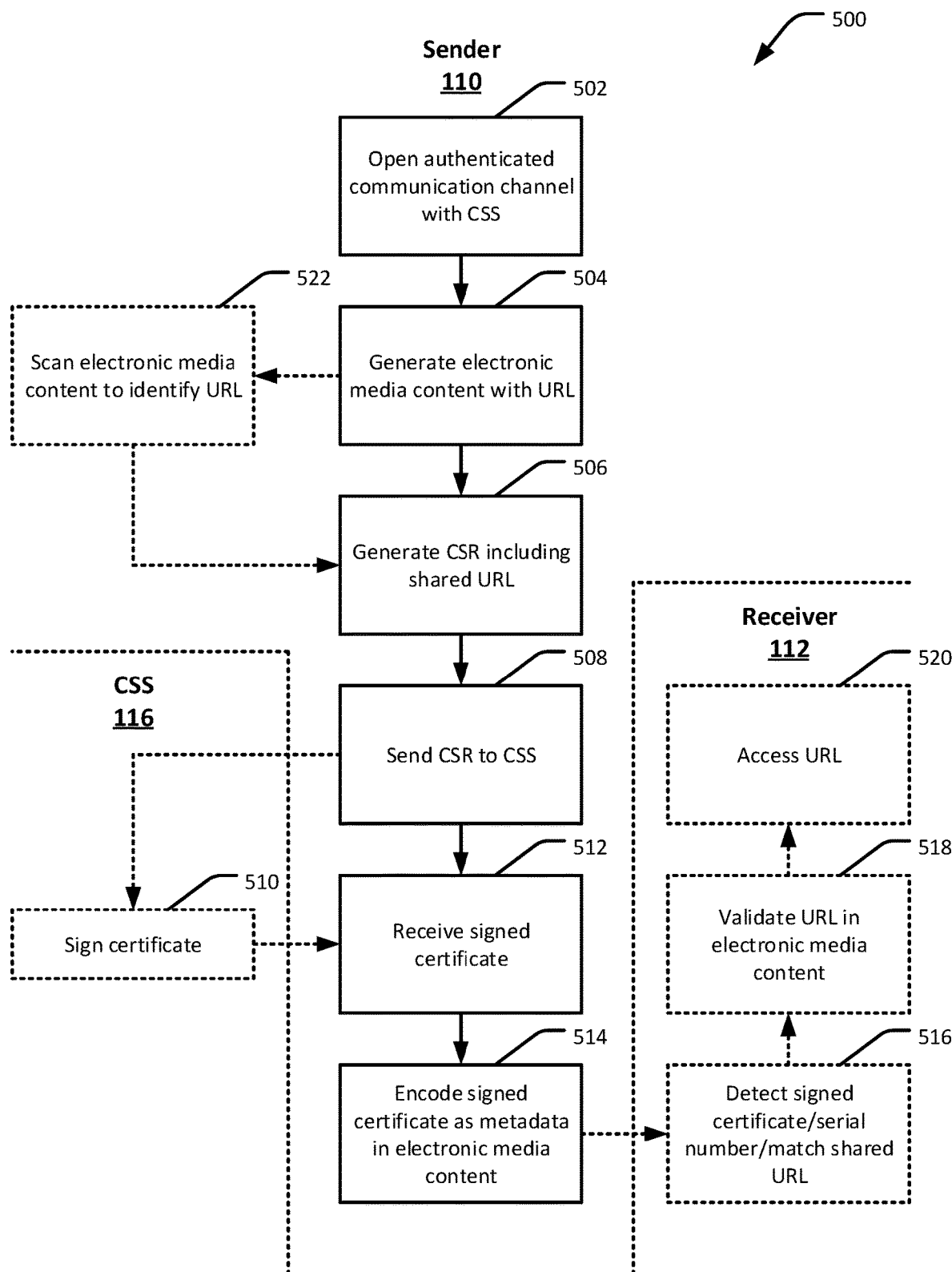
FIG. 5 is a flow diagram of another example method for validating a URL, in accordance with an embodiment of the present disclosure.

FIG. 5 is a flow diagram of another example method 500 for validating a URL, in accordance with an embodiment of the present disclosure. The method 500 can be implemented, for example, in the sender client 110, the CSS 116, and/or the receiver client 112 of FIG. 1. The method 500 provides support for the validation of certificates. As noted above, if the client does not support the validation, the URLs may be displayed without any validation. To this end, in some examples, the method 500, or portions thereof, can be implemented within a plugin module executing on the sender client 110 and/or the receiver client 112. Such a plugin module executes in the background and in conjunction with the application used to generate the electronic media content. In another example, the method 500, or portions thereof, can be provided natively by the application used to generate the electronic media content.

Initially, the method 500 includes opening 502 an authenticated communication channel with the CSS 116. The method 500 further includes generating 504 electronic media content with a URL. To ensure the validity of the URL within the document or email, the sender client 110 obtains a certificate signed by a trusted CA and attaches the certificate, or information identifying the certificate (such as a serial number of the certificate) to the document or email as metadata, which remains associated with the URL unless and until the URL is subsequently modified.

In some examples, the method 500 includes scanning 522 the electronic media content to identify the URL. For example, once the electronic media content is generated 504, the content is automatically scanned via an Application Programming Interface (API) to identify any URLs or hyperlinks that are in the content, which indicates that signed certificates are to be requested for each URL or group of URLs. In another example, the URL and certificate are embedded within the electronic media content or at least linked to the electronic media content so that the certificate remains attached to the content as it is sent from one client to another. Such linking, for example, including inserting a logical link within the electronic media content to a separate data file containing the signed certificate. In this manner, the certificates can be requested and generated without user intervention.

The method 500 further includes generating 506 a Certificate Signing Request (CSR) including the URL. As noted above, the CSR is a block of encoded text that is given to the CA when requesting a signed certificate or SSL certificate. The CSR can be generated by the sender client 110, which also provides the URL. The CSR contains information that will be included in the certificate such as the organization name, common name (username), locality, and country. In some examples, the URL can be included in the SAN field of the certificate, and the common name includes a unique username associated with the sender client 110 or the user requesting the certificate. To obtain the certificate, the method 500 further includes sending 508 the CSR to the CSS 116 via the authenticated communication channel. The CSS 116 uses the CSR to sign 510 the certificate, which is data that digitally binds a cryptographic key to the URL and can be used to authenticate that the URL was sent by the sender client 110. The CSS 116 sends the signed certificate to the sender 110. The method 500 further includes receiving 512 the signed certificate corresponding to the CSR from the CSS 116.

The method 500 further includes encoding 514 the signed certificate as metadata in the electronic media content and/or encoding a serial number (or other unique identifier) associated with the signed certificate as metadata in the electronic media content. By encoding the signed certificate (or its serial number) as metadata in the electronic media content, the URL and the metadata can be copied and pasted together into another document or other content so that the signed certificate is carried along with the URL. If the URL is subsequently modified, the electronic media content scans the content for a new URL, and if one exists, a new certificate is generated with authorization from the sender client 110.

In some examples, the method 500 further includes detecting 516 the signed certificate (or other information such as the serial number of the signed certificate) in the electronic media content and matching the URL/serial number in the electronic media content to the URL/serial number in the signed certificate. If a match is found, the method 500 further includes validating 518 the URL in the electronic media content prior to accessing 520 the URL (such as by clicking on the link to open the corresponding web page or application). The validating 518 can be performed by the receiver client 112 upon or after validating 518 the URL using the signed certificate. The URL can be validated by determining whether the signed certificate is signed by the CA using an enterprise CA certificate. The enterprise CA certificate is provided to the sender and receiver clients when the client joins the domain or the enterprise network. If the certificate validation succeeds, then the certificate is checked to determine whether it contains the URL in the electronic media content. If yes, the URL is displayed as valid on the receiver client 112 (for example, using green text or highlighting over the URL or corresponding text in the electronic media content), otherwise the URL is displayed as invalid (for example, using a strikethrough, or red text or highlighting over the URL or corresponding text in the electronic media content). A URL is invalid, for example, if no certificate is associated with the URL, the certificate associated with the URL is not signed by the CA, or the URL in the certificate does not match the URL in the electronic media content.

Figure 6:
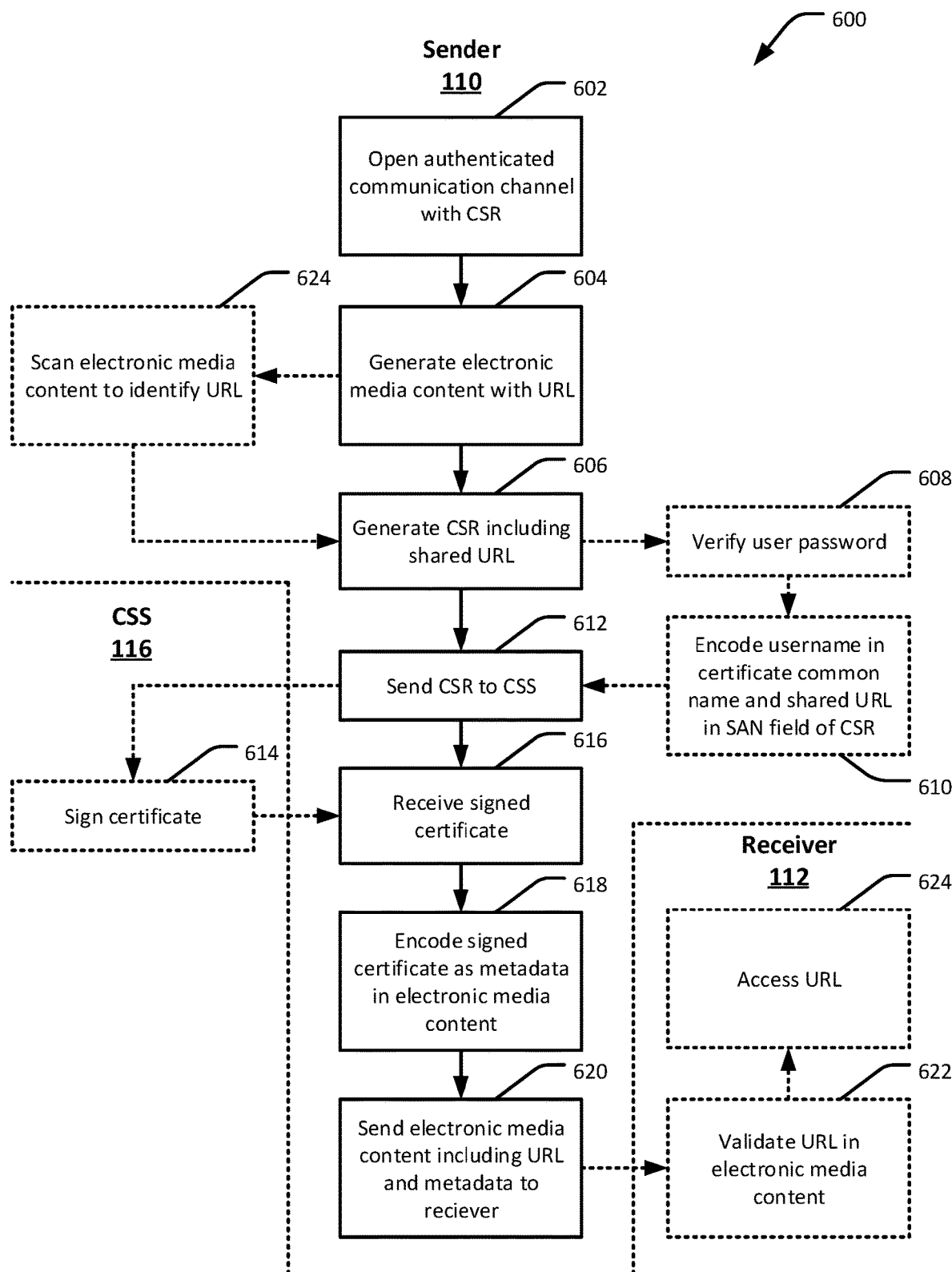
FIG. 6 is a flow diagram of yet another example method for validating a URL, in accordance with an embodiment of the present disclosure.

FIG. 6 is a flow diagram of yet another example method 600 for validating a URL, in accordance with an embodiment of the present disclosure. The method 600 can be implemented, for example, in the sender client 110, the CSS 116, and/or the receiver client 112 of FIG. 1. The method 600 provides support for the validation of certificates. As noted above, if the client does not support the validation, the URLs may be displayed without any validation. To this end, in some examples, the method 600, or portions thereof, can be implemented within a plugin module executing on the sender client 110 and/or the receiver client 112. Such a plugin module executes in the background and in conjunction with the application used to generate the electronic media content. In another example, the method 600, or portions thereof, can be provided natively by the application used to generate the electronic media content.

Initially, the method 600 further includes opening 602 an authenticated communication channel with the CSS 116. The method 600 further includes generating 604 electronic media content with a URL. To ensure the validity of the URL within the document or email, the sender client 110 obtains a certificate signed by a trusted CA and attaches the certificate, or information relating to the certificate (such as a serial number of the certificate) to the document or email as metadata, which remains associated with the URL unless and until the URL is subsequently modified. In some examples, the method 600 includes scanning 624 the electronic media content to identify the URL. For example, once the electronic media content is generated 604, the content is automatically scanned to identify any URLs or hyperlinks that are in the content, which indicates that signed certificates are to be requested for each URL or group of URLs. In this manner, the certificates can be requested and generated without user intervention.

The method 600 further includes generating 606 a Certificate Signing Request (CSR) including the URL. As noted above, the CSR is a block of encoded text that is given to the CA when requesting a signed certificate or SSL certificate. The CSR can be generated by the sender client 110, which also provides the URL. The CSR contains information that will be included in the certificate such as the organization name, common name (domain name), locality, and country. In this example, the URL is included in the SAN field of the certificate, and the common name includes a unique username associated with the sender client 110 or the user requesting the certificate. The method 600 further includes verifying 608 a user password associated with the unique username of the user who is generating the electronic media content. To obtain the certificate, the method 600 further includes sending 606 the CSR to the CSS 116. The CSS 116 uses the CSR to sign 614 the certificate, which is data that digitally binds a cryptographic key to the URL and can be used to authenticate that the URL was sent by the sender client 110. The CSS 116 sends the signed certificate to the sender 110. The method 600 further includes receiving 616 the signed certificate corresponding to the CSR from the CSS 116.

The method 600 further includes encoding 618 the signed certificate as metadata in the electronic media content and/or encoding a serial number (or other unique identifier) associated with the signed certificate as metadata in the electronic media content. The receiver client 112 receives the electronic media content, including the URL and the signed certificate, from the sender client 110. The method 600 further includes validating 622 the URL in the electronic media content prior to accessing 624 the URL (such as by clicking on the link to open the corresponding web page or application). As discussed above, the validating 622 can be performed by the receiver client 112 using the signed certificate.

In some examples, email clients within an enterprise can use the client certificate key pair to sign the email (including the body, the URL and/or the attachment) before sending them. The email can be validated by the recipients. These email clients also catch emails sent from an external domain and alert the user if the certificate is not valid or missing. However, in contrast to existing email signing techniques, the disclosed URL validation techniques complement email signing by working across multiple applications, including but not limited to email, chat, instant messaging, and document sharing. Furthermore, the disclosed URL validation techniques permit a user to copy and paste a URL using certificates as metadata. This enables URL validation across different apps seamlessly without user intervention. Moreover, unlike existing email applications, the disclosed URL validation techniques track the source of the electronic media content by including the username in the common name field of the certificate.

Example Computing Platform

Figure 7:
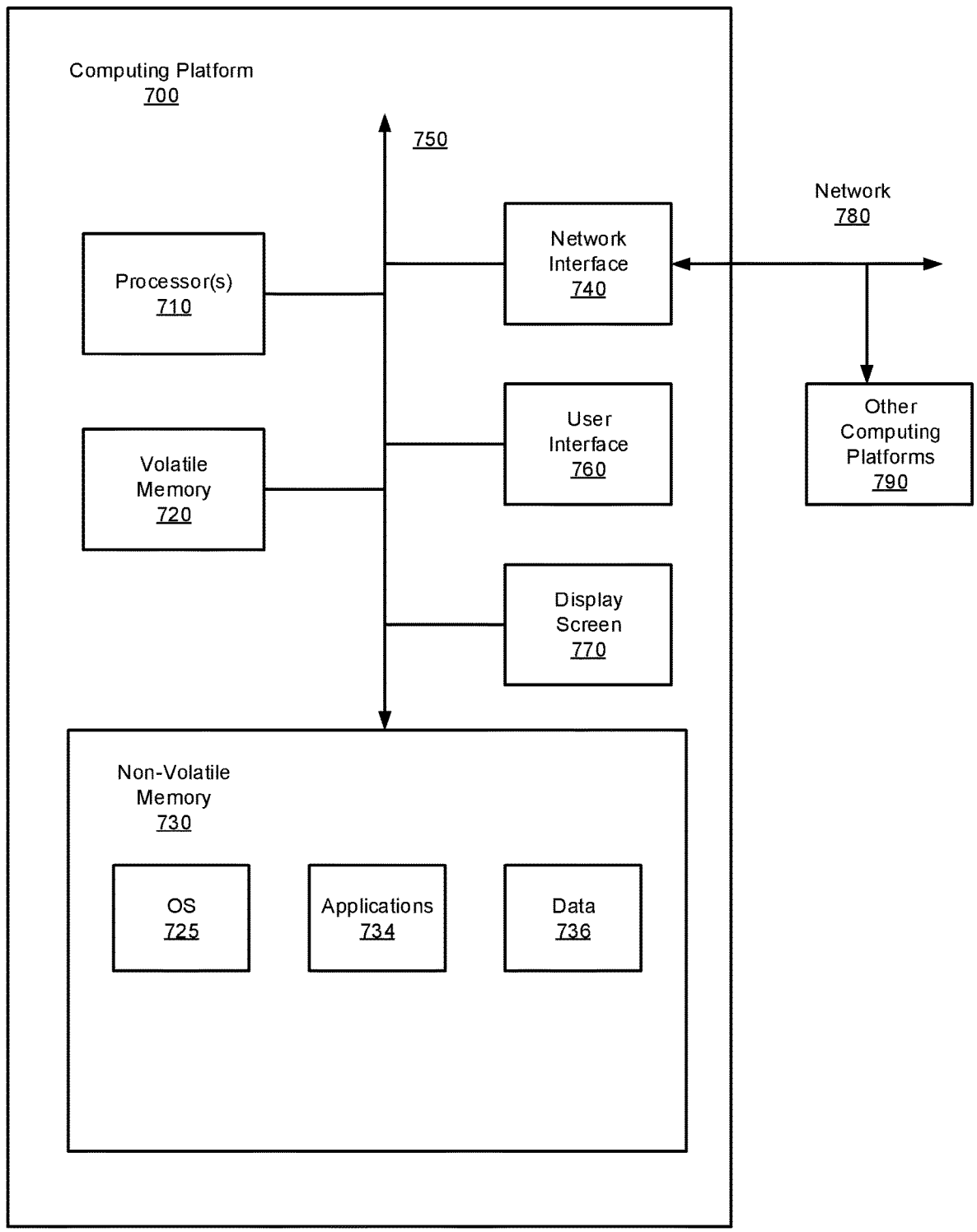
FIG. 7 is a block diagram of a computing platform configured to perform URL validation, in accordance with an example of the present disclosure.

FIG. 7 is a block diagram of a computing platform 700 configured to perform URL validation, in accordance with an example of the present disclosure. In some cases, the platform 700 may be a workstation, a laptop computer, a tablet, a mobile device, or any suitable computing or communication device.

The computing platform or device 700 includes one or more processors 710, volatile memory 720 (e.g., random access memory (RAM)), non-volatile memory 730, one or more network or communication interfaces 740, a user interface (UI) 760, a display screen 770, and a communications bus 750. The computing platform 700 may also be referred to as a computer or a computer system.

The non-volatile (non-transitory) memory 730 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 760 can include one or more input/output (I/O) devices (e.g., a mouse, a keyboard, a microphone, one or more speakers, one or more biometric scanners, one or more environmental sensors, and one or more accelerometers, etc.).

The display screen 770 can provide a graphical user interface (GUI) and in some cases, may be a touchscreen or any other suitable display device.

The non-volatile memory 730 stores an operating system (OS) 725, one or more applications 734, and data 736 such that, for example, computer instructions of the operating system 725 and the applications 734, are executed by processor(s) 710 out of the volatile memory 720. In some examples, the volatile memory 720 can include one or more types of RAM and/or a cache memory that can offer a faster response time than a main memory. Data can be entered through the user interface 760. Various elements of the computer platform 700 can communicate via the communications bus 750.

The illustrated computing platform 700 is shown merely as an example computing device and can be implemented by any computing or processing environment with any type of machine or set of machines that can have suitable hardware and/or software capable of operating as described herein.

The processor(s) 710 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 710 can be analog, digital, or mixed. In some examples, the processor 710 can be one or more physical processors, which may be remotely located or local. A processor including multiple processor cores and/or multiple processors can provide functionality for parallel, simultaneous execution of instructions or for parallel, simultaneous execution of one instruction on more than one piece of data.

The network interfaces 740 can include one or more interfaces to enable the computing platform 700 to access a computer network 780 such as a Local Area Network (LAN), a Wide Area Network (WAN), a Personal Area Network (PAN), or the Internet through a variety of wired and/or wireless connections, including cellular connections. In some examples, the network 780 may allow for communication with other computing platforms 790, to enable distributed computing. In some examples, the network 780 may allow for communication with the one or more of the sender client 110, the receiver client 112, and the CSS 116 of FIG. 1.

The foregoing description and drawings of various embodiments are presented by way of example only. These examples are not intended to be exhaustive or to limit the present disclosure to the precise forms disclosed. Alterations, modifications, and variations will be apparent in light of this disclosure and are intended to be within the scope of the present disclosure as set forth in the claims.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

What is claimed is:

1. A method for validating a uniform resource locator (URL), the method comprising:
   generating electronic media content including the URL;
   generating a Certificate Signing Request (CSR) for the URL by encoding a username in a certificate common name of the CSR and encoding the URL in a Subject Alternative Name (SAN) field of the CSR;
   sending the CSR to a certificate signing server;
   receiving a signed certificate corresponding to the CSR from the certificate signing server, wherein the signed certificate includes data to authenticate that the URL is sent by a sender client;
   encoding, according to a public key cryptographic standard, the signed certificate as metadata in the electronic media content and/or an identifier associated with the signed certificate as metadata in the electronic media content, wherein the electronic media content includes at least two URLs, wherein the SAN field includes the at least two URLs, and wherein the encoding includes encoding the metadata including the at least two URLs; and
   validating the URL in the electronic media content without user intervention based on the signed certificate encoded as metadata to ensure that the URL is not modified since creation, wherein validating the URL comprises:
   detecting, in the metadata, the encoded signed certificate and/or the encoded serial number associated with the signed certificate,
   matching the URL in the electronic media content to a domain name in a SAN field of the encoded signed certificate, and
   validating the encoded signed certificate prior to accessing the URL.

2. The method of claim 1, further comprising validating the URL by at least one of:
   detecting, in the metadata, the encoded signed certificate and/or the encoded serial number associated with the signed certificate; and/or
   matching the URL to a domain name in the encoded signed certificate.

3. The method of claim 2, further comprising validating the URL prior to accessing the URL.

4. The method of claim 1, further comprising scanning the electronic media content to identify the URL.

5. The method of claim 1, further comprising sending the electronic media content including the URL and the metadata to a receiver.

6. The method of claim 1, further comprising matching the URL in the electronic media content to a valid URL in the SAN field of the encoded signed certificate.

7. The method of claim 1, wherein the username is associated with the sender client, and the SAN comprises the URL which is being shared with the electronic media content.

8. The method of claim 1, further comprising a step of tracking a source of the electronic media content by including the username in the certificate common name of the signed certificate.

9. A computer program product including one or more non-transitory machine-readable mediums having instructions encoded thereon that when executed by at least one processor cause a process to be carried out, the process comprising:
   generating electronic media content including at least one Uniform Resource Locator (URL);
   generating a Certificate Signing Request (CSR) for the at least one URL including a Subject Alternative Name (SAN) field, the SAN field including the at least one URL;
   sending the CSR to a certificate signing server;
   receiving a signed certificate corresponding to the CSR from the certificate signing server, wherein the signed certificate includes data to authenticate that the URL is sent by a sender client;
   encoding, according to a public key cryptographic standard, the signed certificate and/or a serial number associated with the signed certificate as metadata in the electronic media content including the at least one URL,
   wherein the electronic media content includes at least two URLs, wherein the SAN field includes the at least two URLs, and wherein the encoding includes encoding the metadata including the at least two URLs; and
   validating the URL in the electronic media content without user intervention based on the signed certificate encoded as metadata to ensure that the URL is not modified since creation, wherein validating the URL comprises:
   detecting, in the metadata, the encoded signed certificate and/or the encoded serial number associated with the signed certificate,
   matching the URL in the electronic media content to a domain name in a SAN field of the encoded signed certificate and
   validating the encoded signed certificate prior to accessing the URL.

10. The computer program product of claim 9, wherein the process further comprises scanning the electronic media content to identify the at least one URL.

11. The computer program product of claim 9, wherein the process further comprises sending the electronic media content including the at least one URL and the encoded metadata to a receiver.

12. The computer program product of claim 9, wherein the process further comprises:
   generating the CSR by including a username in a certificate common name of the CSR such that the username is to be included in the certificate common name of the signed certificate received from the certificate signing server; and
   validating the at least one URL by matching the username in the certificate common name of the signed certificate with a username of a sender that generated the electronic media content.

13. The computer program product of claim 12, wherein the process further comprises verifying a user password subsequent to generating the CSR and prior to sending the CSR to the certificate signing server.

14. A system comprising:
   a storage; and
   at least one processor operatively coupled to the storage, the at least one processor configured to execute instructions stored in the storage that when executed cause the at least one processor to carry out a process including:
   generating a Certificate Signing Request (CSR) including a username in a certificate common name of the CSR and a Subject Alternative Name (SAN) field, the SAN field including a Uniform Resource Locator (URL);
   sending the CSR to a certificate signing server;

receiving a signed certificate corresponding to the CSR from the certificate signing server, wherein the signed certificate includes data to authenticate that the URL is sent by a sender client;

encoding, according to a public key cryptographic standard, the signed certificate and/or a serial number associated with the signed certificate as metadata in electronic media content including the URL, wherein the electronic media content includes at least two URLs, wherein the SAN field includes the at least two URLs, and wherein the encoding includes encoding the metadata including the at least two URLs; and validating the URL in the electronic media content without user intervention based on the signed certificate encoded as the metadata to ensure that the URL is not modified since creation, wherein validating the URL comprises:

detecting, in the metadata, the encoded signed certificate and/or the encoded serial number associated with the signed certificate, matching the URL in the electronic media content to a domain name in a SAN field of the encoded signed certificate, and validating the encoded signed certificate prior to accessing the URL.

15. The system of claim 14, wherein the process further comprises generating the electronic media content including the URL.

16. The system of claim 14, wherein the process further comprises opening an authenticated communication channel from the sender to a certificate signing server, wherein the CSR is sent to the certificate signing server via the authenticated communication channel.

17. The system of claim 14, wherein the process further comprises:

validating the URL by detecting, in the metadata, the encoded signed certificate and/or the encoded serial number associated with the signed certificate;

matching the URL in the electronic media content to a SAN field of the encoded signed certificate in the metadata; and validating the encoded signed certificate prior to accessing the URL.

18. The system of claim 14, wherein the process further comprises generating the CSR by including a non-URL unique username to be used as a certificate common name associated with the signed certificate in addition to the URL in the SAN field.

19. The system of claim 18, wherein the process further comprises verifying a user password associated with the unique username subsequent to generating the CSR and prior to sending the CSR to the certificate signing server.

* * * * *